US009354395B2

United States Patent
Uchida et al.

(10) Patent No.: US 9,354,395 B2
(45) Date of Patent: May 31, 2016

(54) OPTICAL WAVEGUIDE ELEMENT AND METHOD OF PRODUCING THE SAME

(71) Applicant: FURUKAWA ELECTRIC CO., LTD., Tokyo (JP)

(72) Inventors: Yasuyoshi Uchida, Tokyo (JP); Yuuki Taniguchi, Tokyo (JP); Hiroshi Kawashima, Tokyo (JP); Kazutaka Nara, Tokyo (JP); Masanori Takahashi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/189,127

(22) Filed: Feb. 25, 2014

(65) Prior Publication Data

US 2014/0241683 A1    Aug. 28, 2014

(30) Foreign Application Priority Data

Feb. 26, 2013  (JP) ................................ 2013-036406

(51) Int. Cl.
| | |
|---|---|
| *G02B 6/10* | (2006.01) |
| *G02B 6/02* | (2006.01) |
| *G02B 6/00* | (2006.01) |
| *G02B 6/136* | (2006.01) |
| *G02B 6/122* | (2006.01) |
| *G02B 6/12* | (2006.01) |

(52) U.S. Cl.
CPC ................ *G02B 6/136* (2013.01); *G02B 6/122* (2013.01); *G02B 2006/121* (2013.01)

(58) Field of Classification Search
CPC ..................... G02B 6/136; G02B 2006/12038; G02B 6/12169
USPC .................. 385/123, 129–132, 141, 142, 144
See application file for complete search history.

(56) References Cited

U.S. PATENT DOCUMENTS

| | | | | |
|---|---|---|---|---|
| 5,117,470 | A * | 5/1992 | Inoue et al. ..................... | 385/14 |
| 2002/0154878 | A1* | 10/2002 | Akwani et al. ................ | 385/129 |
| 2009/0052856 | A1* | 2/2009 | Bae et al. ....................... | 385/131 |
| 2012/0261625 | A1* | 10/2012 | Chiu et al. ................ | 252/519.3 |
| 2014/0212102 | A1* | 7/2014 | Hoover et al. ................ | 385/126 |

FOREIGN PATENT DOCUMENTS

| | | |
|---|---|---|
| JP | 2005-531030 | 10/2005 |
| WO | WO 2004/001463 A1 | 12/2003 |

OTHER PUBLICATIONS

R. Sara, et al., "Photolithography Fabrication of Sol-Gel Ridge Waveguide", SPIE, Part of the SPIE Conference on Organic-Inorganic Hybrid Materials for Photonics, Jul. 1998, vol. 3469, pp. 118-123.

S. Iraj Najafi, et al., "Sol-Gel Glass Waveguide and Grating on Silicon", Journal of Lightwave Technology, vol. 16, No. 9, Sep. 1998, 7 pages.

* cited by examiner

*Primary Examiner* — Kaveh C Kianni
*Assistant Examiner* — Hung Lam
(74) *Attorney, Agent, or Firm* — Oblon, McClelland, Maier & Neustadt, L.L.P.

(57) ABSTRACT

An optical waveguide element includes a cladding portion made of a silica-based glass, and an optical waveguide positioned in the cladding portion and made of a silica-based glass in which a $ZrO_2$ particle is dispersed.

8 Claims, 7 Drawing Sheets

| COMPARATIVE EXAMPLE | EXAMPLE | REFERENCE EXAMPLE |
|---|---|---|
| 1.9 nm/sec | 6.2 nm/sec | 9.5 nm/sec |

OPTICAL WAVEGUIDE ELEMENT AND METHOD OF PRODUCING THE SAME

CROSS REFERENCES TO RELATED APPLICATIONS

This application is based upon and claims the benefit of priority from Japanese Patent Application No. 2013-036406, filed Feb. 26, 2013, the entire contents of which are incorporated herein by reference.

BACKGROUND

1. Field of Invention

The present invention relates to an optical waveguide element and method of producing the same.

2. Explanation of Related Art

A technology is disclosed that uses zirconia ($ZrO_2$) as a dopant increasing a refractive index of an optical waveguide constituting a Planar Lightwave Circuit (PLC) element made of a silica-based glass (see Japanese Translation of PCT International Application Publication No. 2005-531030). $ZrO_2$ is a material having a refractive index higher than that of Germania ($GeO_2$) and a thermal expansion coefficient smaller than that of $GeO_2$. For that reason, $ZrO_2$ is expected to be a material that enables a PLC component or the like to be downsized and is capable of reducing a stress residing in a waveguide.

Conventionally, a technology is disclosed by which an optical waveguide containing $ZrO_2$ is formed by using sol-gel method (see R. Sara et al. "Photolithography Fabrication of Sol-Gel Ridge Waveguide" SPIE vol. 3469 p. 118-123(1998), and S. Iraj et al. "Sol-Gel Glass Waveguide and Grating on Silicon" J. LIGHTWAVE TECH. VOL. 16, NO. 9, (1998) (hereinafter called Reference Literatures 1 and 2).).

SUMMARY OF INVENTION

It is an object of the present invention to at least partially solve the problem in the conventional technology.

An optical waveguide element according to an aspect of the present invention includes a cladding portion made of a silica-based glass, and an optical waveguide positioned in the cladding portion and made of a silica-based glass in which a $ZrO_2$ particle is dispersed.

A method of producing an optical waveguide element according to an aspect of the present invention includes forming a cladding portion made of a silica-based glass, and forming an optical waveguide positioned in the cladding portion and made of a silica-based glass in which a $ZrO_2$ particle is dispersed.

The above and other features, advantages and technical and industrial significance of this invention will be better understood by reading the following detailed description of presently preferred embodiments of the invention, when considered in connection with the accompanying drawings.

DETAILED EXPLANATION OF PREFERABLE EMBODIMENTS

Hereinafter, embodiments of an optical waveguide element and a method of producing the optical waveguide element according to the present invention will be described in detail with reference to the accompanying drawings. It should be noted that the present invention is not limited by the embodiments and can be modified in various ways without departing from the spirit of the present invention. In the drawings, if deemed appropriate, identical or equivalent elements are given same reference numerals. The drawings are schematic depictions, and do not represent the actual relation between a width and a thickness of each element and ratios of each element. Different drawings may include portions using different scales and dimensional relations.

$ZrO_2$ is known as a material which is difficult to be etched. For example, the etching rate of $ZrO_2$ is slow for a fluorine-based etchant used in an ordinary process of fabricating a silica-based glass-based PLC element. As a result, there is a problem that a conventional optical waveguide element using $ZrO_2$ is costly because the optical waveguide element is low in processability and thus time-consuming for producing.

In contrast, embodiments hereinafter described can realize a small-size and low-cost optical waveguide element.

Figure 1:
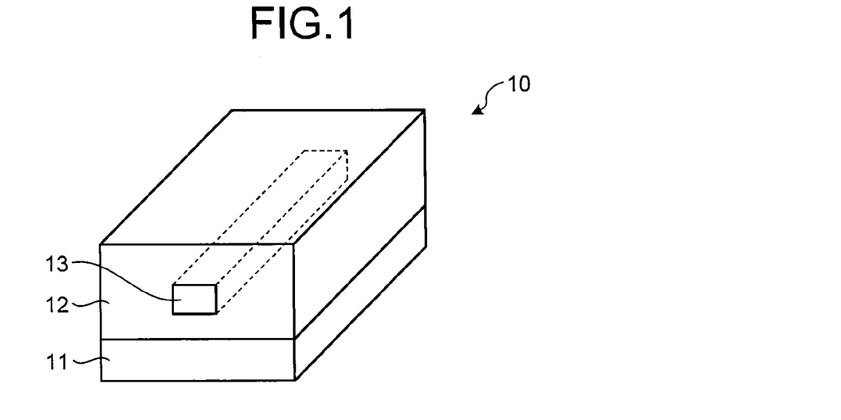
FIG. 1 is a schematic perspective view of an optical waveguide element according to an embodiment.

FIG. 1 is a schematic perspective view of an optical waveguide element according to an embodiment. As illustrated in FIG. 1, an optical waveguide element 10 includes a cladding portion 12 made of a silica-based glass and formed on a substrate 11 such as a silicon or a silica glass, and an optical waveguide 13 positioned in the cladding portion 12.

The optical waveguide element 10 can be used as an element constituting, for example, an waveguide type optical interferometer such as a Mach-Zehnder Interferometer (MZI) or a demodulation element for demodulating a D(Q)PSK optical signal in a communication scheme such as a Differential Quadrature Phase Shift Keying(DQPSK) or Differential Phase Shift Keying(DPSK).

The optical waveguide 13 is made of a silica-based glass containing $ZrO_2$ that is a dopant increasing a refractive index. Since a refractive index of the optical waveguide 13 is higher than that of the cladding portion 12, the optical waveguide 13 serves as an optical waveguide that confines and guides a light therein. A relative refractive-index difference of the optical waveguide 13 relative to the cladding portion 12 is, for example, 5% to 10%, and a cross section is 3.0 μm×3.0 μm to 2.5 μm×2.5 μm to 1.5 μm×1.5 μm in size. The cross section of the optical waveguide 13 is basically a square in shape, but may be a rectangle in shape.

Since the optical waveguide 13 contains $ZrO_2$, the refractive index of the optical waveguide 13 can be higher than that in case of using $GeO_2$ as a dopant increasing the refractive index. The relative refractive-index difference of the optical waveguide 13 relative to the cladding portion 12 can be, for example, 1.5% to 30% by adjusting the amount of $ZrO_2$ contained in the optical waveguide 13. In contrast, the relative refractive-index difference of the optical waveguide using $GeO_2$ is generally lower than 1.5% or approximately 2.5% at maximum. Therefore, a waveguide length that is necessary for producing a desirable optical interference when using the optical waveguide element 10 for an element constituting an optical interference element or the like becomes shorter in proportion to a degree of refractive index. This results in downsizing of the optical waveguide element 10.

$ZrO_2$ contained in the optical waveguide 13 is mostly dispersed in a state of particles. A particle size of $ZrO_2$ is equal to or smaller than 100 nm, and an average distance between $ZrO_2$ particles is equal to or larger than 100 nm. Since this results in suppressing the $ZrO_2$ particles in the optical waveguide 13 from dispersing a light input into the optical waveguide 13, thereby preferably suppressing an increase in a waveguide optical loss of the optical waveguide element 10. It is preferable that the average distance between $ZrO_2$ particles is equal to or smaller than the wavelength of a light input into the optical waveguide 13. If the average distance between $ZrO_2$ particles is too large, a fluctuation occurs because a refractive index differs depending on the place. If the refractive index fluctuates, a Rayleigh scattering occurs, and thereby a waveguide optical loss of the optical waveguide element 10 may increase.

The particle size herein is a value obtained by using Scherrer's Equation from an X-ray diffraction pattern, for example. The average distance between particles is a value obtained by observation using a TEM.

In the present specification, "$ZrO_2$ particle" means a $ZrO_2$ crystalline particle or a $ZrO_2$ non-crystalline particle.

A wavelength of a light to be input is not limited specifically. For example, in case where the optical waveguide element 10 is an element to be used for a light at 1.5 μm wavelength band (approximately 1.5 μm to 1.62 μm), which is a communication wavelength band, it is preferable that an average distance between $ZrO_2$ particles is equal to or smaller than 1.62 μm that is the upper limit of the wavelength band. In case of using another wavelength band of a light at which the optical waveguide element 10 is used, for example, 1.3 μm wavelength band (approximately 1.26 μm to 1.36 μm), 1.0 μm wavelength band (approximately 1.0 μm to 1.1 μm), or 0.8 μm wavelength band (approximately 0.79 μm to 0.83 μm), it is preferable that an average distance between $ZrO_2$ particles is equal to or smaller than the upper limit of each wavelength band.

Since a thermal expansion coefficient of $ZrO_2$ is small, a residual stress produced in the optical waveguide 13 is small even if temperature varies in a production process or an environment temperature varies. As a result, an increase in the waveguide optical loss of the optical waveguide element 10 is preferably suppressed and a decrease in reliability is preferably prevented.

The optical waveguide 13, which contains a $ZrO_2$ particle, is high in processability in an etching step as described later and can be produced within a shorter time than a conventional one. As a result, the optical waveguide element 10 can be produced at a low cost.

Figure 2:
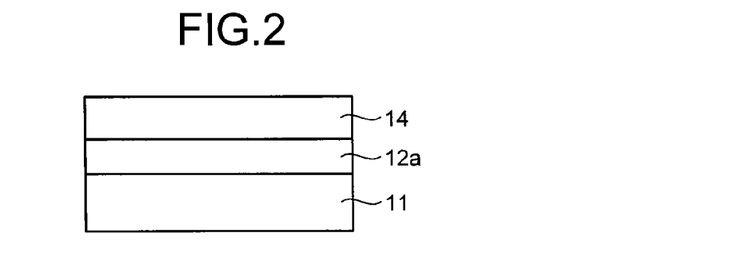
FIG. 2 is a drawing explaining an example of a method for producing the optical waveguide element illustrated in FIG. 1.

An example of a method of producing the optical waveguide element 10 illustrated in FIG. 1 will be explained. As illustrated in FIG. 2, a lower cladding layer 12a made of a silica-based glass is first formed on a substrate 11 by using, for example, plasma CVD (Chemical Vapor Deposition) method, and then annealed to be transparently vitrified. The optical-waveguide-forming layer 14 for forming an optical waveguide on the lower cladding layer 12a is then formed by a sputtering method using an $SiO_2$ target and a $ZrO_2$ target both of which are unary targets. A binary target made of a mixture of $SiO_2$ and $ZrO_2$ may be used. The optical-waveguide-forming layer 14 thus formed is considered to be in an amorphous state in which $SiO_2$ and $ZrO_2$ form a network.

Figure 3:
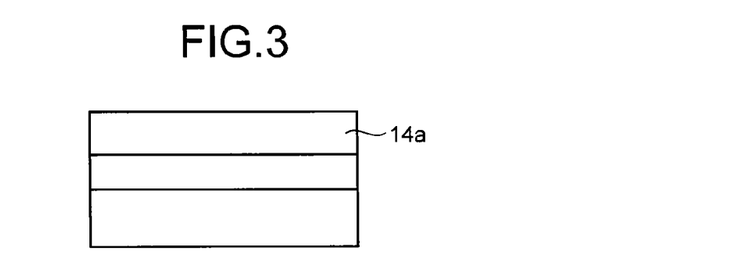
FIG. 3 is a drawing explaining an example of a method for producing the optical waveguide element illustrated in FIG. 1.

After that, as illustrated in FIG. 3, the optical-waveguide-forming layer 14 is heat-treated. The optical-waveguide-forming layer 14 is hereby annealed to precipitate and form a $ZrO_2$ crystalline particle, and becomes an optical-waveguide-forming layer 14a. The $ZrO_2$ crystalline particles thus formed are dispersed in the optical-waveguide-forming layer 14a almost uniformly. The particle size of the $ZrO_2$ crystalline particle can be adjusted by changing a heat-treating temperature and a heat-treating time. For example, a larger size of $ZrO_2$ crystalline particle can be formed by increasing the heat-treating temperature or by increasing the heat-treating time. The optical-waveguide-forming layer 14 is, when being formed, considered to be in an amorphous state and not to contain a $ZrO_2$ crystalline particle. Since the $ZrO_2$ crystalline particle may be considered to be precipitated and formed by the heat-treatment, the particle size can be controlled very easily. Therefore, it is possible to easily control the particle size of the $ZrO_2$ crystalline particle to be equal to or smaller than 100 nm and the average distance between the crystalline particles to be equal to or greater than 100 nm or to be equal to or smaller than the wavelength of the light to be used by adjusting a concentration of $ZrO_2$, and adjusting the heat-treating temperature and the heat-treating time.

Although $ZrO_2$ produced by the above-described method is dispersed in a state of a crystalline particle, $ZrO_2$ acts similarly even if $ZrO_2$ is in a state of a non-crystalline particle.

A defect may be often formed in the optical-waveguide-forming layer 14 due to a lack of oxygen in case of forming the optical-waveguide-forming layer 14 by the above-described sputtering method. However, conducting a step of forming a $ZrO_2$ crystalline particle by annealing the optical-waveguide-forming layer 14 under an oxygen atmosphere or under an atmosphere containing oxygen such as air causes an oxygen to be introduced to the optical-waveguide-forming layer 14a to decrease a defect, thus stabilizing the refractive index. It is preferable that the heat-treating temperature is equal to or higher than 1000° C. since oxygen can be introduced easily.

Meanwhile, when forming an optical waveguide containing $ZrO_2$ by using sol-gel method like Reference Literatures 1 and 2 for example, there are cases where an organic substance such as a solvent resides in the optical waveguide. Therefore, conducting a heat-treatment of equal to or higher than 1000° C. often causes the residing organic substance to be gasified to produce a bubble in the optical waveguide. Since an organic substance absorbs a specific wavelength of infrared ray, the organic substance causes an increase in a waveguide loss if the organic substance is contained in the optical waveguide.

In contrast, the optical-waveguide-forming layer 14 not containing an organic substance can be formed in case of using the above-described sputtering method. Therefore, a particle size of a $ZrO_2$ crystalline particle in the optical-waveguide-forming layer 14a and an average distance between crystalline particles can be controlled by conducting a heat-treatment at equal to or higher than 1000° C. without producing a bubble. An increase in a waveguide loss of the optical waveguide 13 is also prevented.

Figure 4:
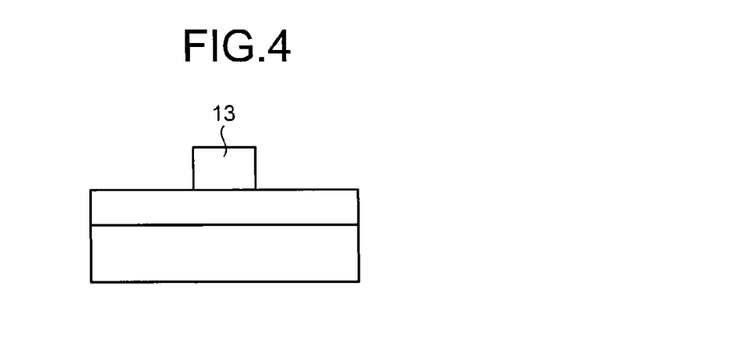
FIG. 4 is a drawing explaining an example of a method for producing the optical waveguide element illustrated in FIG. 1.

After that, the optical-waveguide-forming layer 14a is patterned by a photolithography technique and an etching as illustrated in FIG. 4 to form the optical waveguide 13. The etching may be a dry-etching using a fluorine-based gas (for example, $CF_4$) which is used in a process of fabricating a silica-based glass, for example.

Most of $ZrO_2$ are dispersed in the optical-waveguide-forming layer 14a in a state of a crystalline particle. The optical-waveguide-forming layer 14a is hereby easy to be fabricated by etching.

Figure 5:
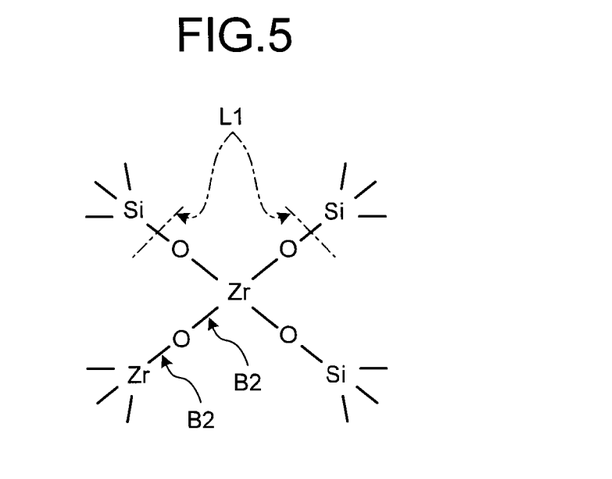
FIG. 5 is a view for explaining an etching of a conventional silica-based glass containing $ZrO_2$.

FIG. 5 is a view for explaining an etching of a conventional silica-based glass containing $ZrO_2$. As illustrated in FIG. 5, in case of the conventional silica-based glass containing $ZrO_2$, $SiO_2$ and $ZrO_2$ form a network in an amorphous state. Since a bond of an O atom and an Si atom (Si—O bond) in this state can be broken easily by a plasma of a fluorine-based gas as illustrated by a line Ll, etching is easy. In contrast, like a bond B2, a bond of an O atom and a Zr atom (Zr—O bond) cannot be broken easily by a plasma of a fluorine-based gas. In case where an $SiO_2$ and a $ZrO_2$ form a network in a silica-based glass, the Zr—O bond must be broken for etching since the Zr—O bonds are dispersed in the network. Accordingly, conducting a predetermined amount of etching takes time because an etching rate slows down.

Figure 6:
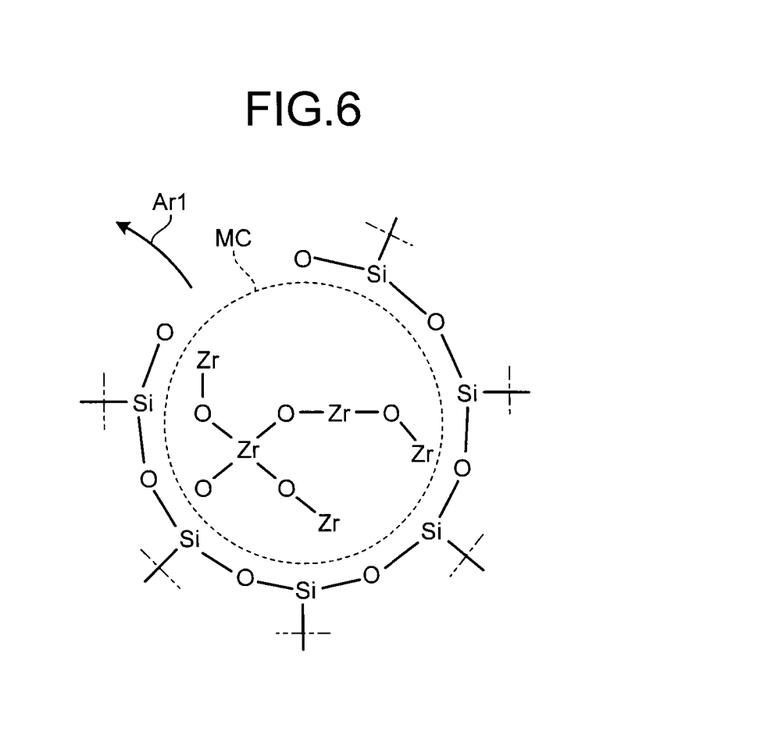
FIG. 6 is a view for explaining the etching in FIG. 4.

In contrast, FIG. 6 is a view for explaining an etching in FIG. 4. In case of FIG. 4, most of $ZrO_2$ are dispersed in a state of a crystalline particle MC in an $SiO_2$ network. In this case, the whole crystalline particle MC can be etched by cutting an Si—O bond at an alternate long and short dash line illustrated and without cutting the Zr—O bond contained in the crystalline particle MC. The crystalline particle MC desorbs from the $SiO_2$ network easily as illustrated by an arrow Arl while maintaining the state of a crystalline particle. Since the etching rate is greater than that in a case where the Zr—O bond must be broken, a time required to conduct a predetermined quantity of etching is shortened. Since an ordinary fabrication process for a silica-based glass-based PLC element is applied suitably to conduct a sufficient etching, an equipment cost can be saved. Therefore, an optical waveguide element can be produced at a lower cost.

An effect of increasing the etching rate can be obtained sufficiently if the $ZrO_2$ crystalline particle size is equal to or smaller than 100 nm and the average distance between crystalline particles is equal to or larger than 100 nm and equal to or smaller than the wavelength of the light to be used.

Figure 7:
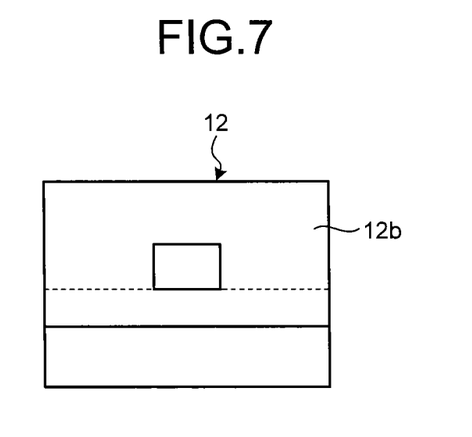
FIG. 7 is a drawing explaining an example of a method for producing the optical waveguide element illustrated in FIG. 1.

After that, an upper cladding portion 12b is formed to cover the lower cladding layer 12a and the optical waveguide 13 to form the cladding portion 12 constituted by the lower cladding layer 12a and the upper cladding portion 12b as illustrated in FIG. 7. The upper cladding portion 12b can be formed by stacking a particle made of a silica-based glass to cover the lower cladding layer 12a and the optical waveguide 13 by, for example, a known Flame Hydrolysis Deposition (FHD) method and by heating and melting the particle to be vitrified transparently.

In case of forming the upper cladding portion 12b by FHD method as described above, a heat treatment is conducted at, for example, approximately 1000° C. As described above, when an organic substance resides in the optical waveguide, there are cases where the residing organic substance is gasified to produce a bubble by the heat-treatment. In contrast, in case of forming an optical waveguide by the sputtering method as described above, the upper cladding portion 12b can be formed by FHD method without producing a bubble.

A heat-treatment for forming a $ZrO_2$ crystalline particle at a temperature equal to or higher than the heat-treating temperature in FHD method is preferable since the heat treatment in FHD method changes the $ZrO_2$ crystalline particle very little. That is, it is preferable that a heat treatment temperature at which a $ZrO_2$ crystalline particle is formed is the highest in a thermal history in a production process since the $ZrO_2$ crystalline particle changes very little even if a heat-treatment is conducted subsequently at a temperature equal to or lower than the highest heat treatment temperature. For such a heat-treatment, there is a step of heat-treating a surface of the cladding portion 12 for forming an insulating film made of $SiN_X$ at a temperature of approximately 400° C.

According to the producing method described above, the optical waveguide element 10 illustrated in FIG. 1 can be produced at a low cost since a time for etching the optical-waveguide-forming layer 14a to form the optical waveguide 13 is shortened.

Then, samples were produced by forming a lower cladding layer made of a silica glass on a silicon substrate and by further forming an optical-waveguide-forming layer on the lower cladding layer by the sputtering method under an oxygen atmosphere by using the $SiO_2$ target and the $ZrO_2$ target according to the steps explained with reference to FIGS. 2 to 4. The concentrations of $ZrO_2$ were adjusted to obtain 4.7%, 9.27%, 11.60%, and 13.94% of relative refractive-index differences of the optical-waveguide-forming layers relative to the lower cladding layers. After that, the optical-waveguide-forming layers of the produced samples were heat-treated at annealed temperatures set at intervals of 100° C. from 800° C. to 1300° C. for one hour. For the heat-treated samples, an x-ray diffraction (XRD) pattern and a refractive index of the optical-waveguide-forming layer were measured and TEM observation was conducted.

Figure 8:
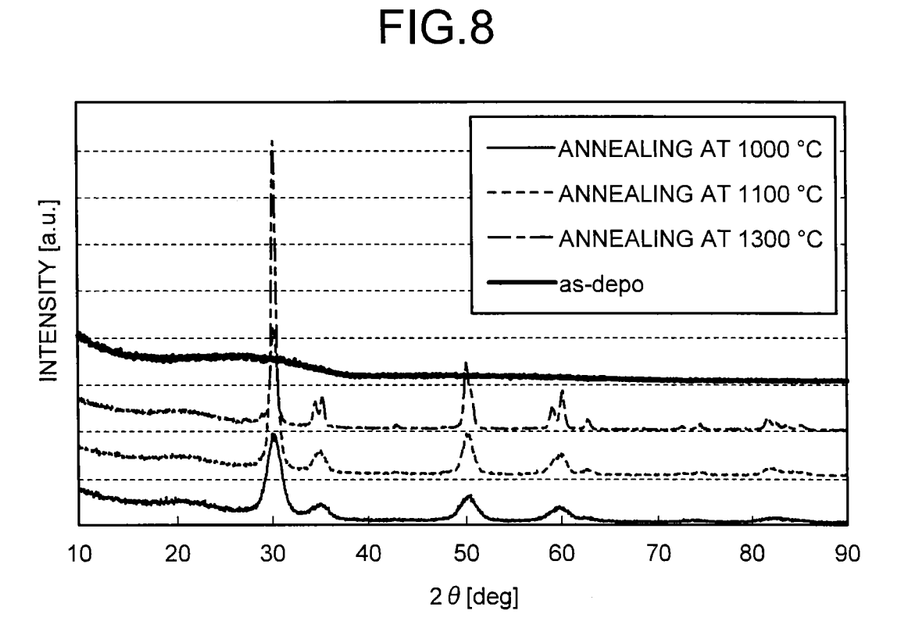
FIG. 8 is a drawing illustrating XRD patterns at different heat-treating temperatures.

FIG. 8 is a drawing illustrating XRD patterns at different annealed temperatures. FIG. 8 is a data on a sample of which relative refractive-index difference of an optical-waveguide-forming layer is 11.60%. A term "as-depo" indicates a data on a sample not annealed. As illustrated in FIG. 8, since no peak is present in a state of as-depo, the optical-waveguide-forming layer is considered to be in an amorphous state. The samples heat-treated at temperatures of 1000° C. to 1300° C. indicated more acute peaks caused by a $ZrO_2$ crystal corresponding to higher annealed temperatures. The results shown in FIG. 8 indicate that a greater size of $ZrO_2$ crystalline particle precipitates at a higher annealed temperature. Particle sizes of $ZrO_2$ crystalline particles of the samples annealed at the respective temperatures were estimated by using Scherrer's Equation from the data shown in FIG. 8. As a result, particle sizes were approximately 1.2 nm, approximately 2 nm, and approximately 5 nm for the samples annealed at 1000° C., 1100° C., and 1300° C. respectively.

Figure 9:
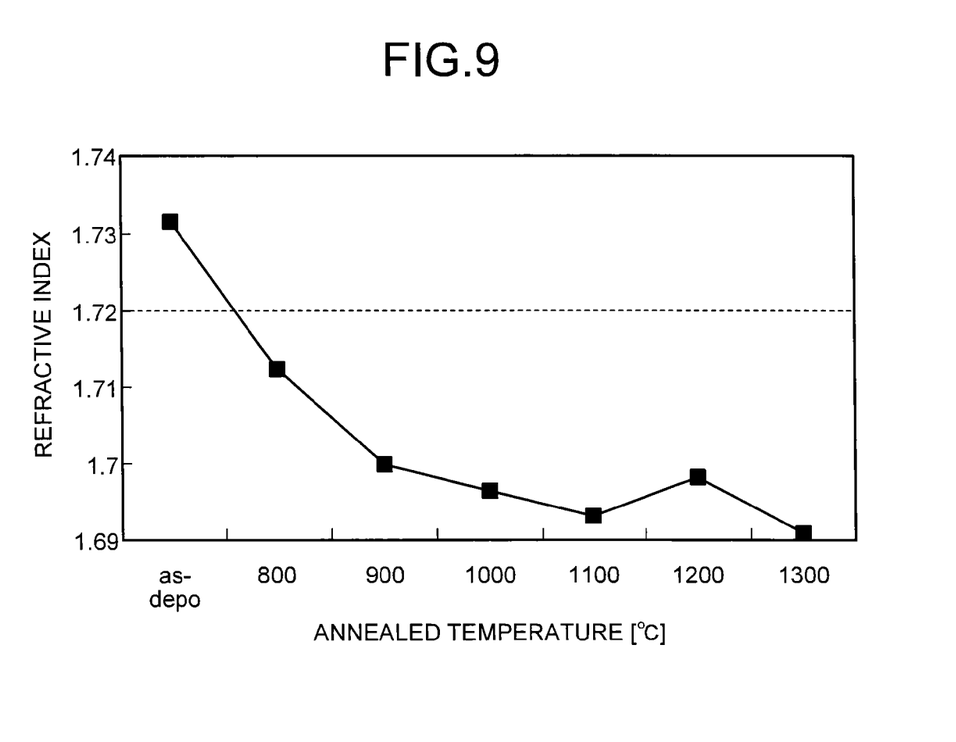
FIG. 9 is a view illustrating a relationship between an annealed temperature and a refractive index.

FIG. 9 is a view illustrating a relationship between an annealed temperature and a refractive index. FIG. 9 is a data on the sample of which relative refractive-index difference of the optical-waveguide-forming layer is 11.60%. FIG. 9 indicates that a refractive index is high in a state of as-depo, and a refractive index of a sample annealed at equal to or higher than 1000° C. is stable within 1.69 to 1.7. The result shown in FIG. 9 is considered to indicate that, when setting the annealed temperature at equal to or higher than 1000° C., the refractive index becomes stable because an oxygen is introduced to the optical-waveguide-forming layer.

Average distances between $ZrO_2$ crystalline particles of the samples annealed at respective temperatures were subjected to TEM observation.

It was observed that the $ZrO_2$ crystalline particles were present in dispersion for the samples annealed at temperatures of 1000° C., 1100° C., and 1300° C., and the average distance between particles of any sample was equal to or longer than 100 nm and equal to or smaller than 1.62 μm. Herein the average distance between particles means a minimum distance between outer edges of adjacent particles.

After that, the sample (comparative example) indicated as as-depo and the sample (example) annealed at the temperature of 1100° C. were subjected to dry-etchings using a fluorine-based gas to measure etching rates.

Figure 10:
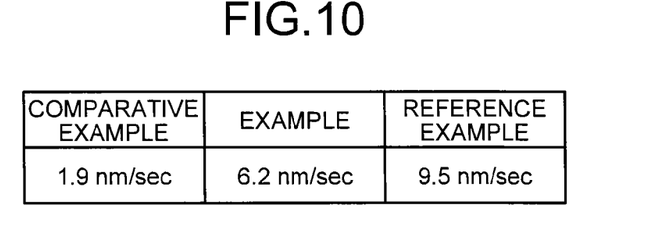
FIG. 10 is a view illustrating etching rates in a comparative example, an example, and a reference example.

FIG. 10 is a view illustrating etching rates in the comparative example, the example, and the reference example. Herein the reference example indicates an etching rate in case of conducting a dry-etching using a fluorine-based gas on a sample made of a silica glass which is doped with $GeO_2$. The silica glass was doped with $GeO_2$ so that a relative refractive-index difference relative to the silica glass is 1.5%.

As illustrated in FIG. 10, an etching rate for the sample of the comparative example not containing a $ZrO_2$ particle was low as 1.9 nm/sec which is ⅕ of an etching rate of 9.5 nm/sec of a sample of the reference example which is a material constituting a typical optical waveguide. In contrast, in case of the sample of the example containing a $ZrO_2$ crystalline particle, an etching rate was drastically high as 6.2 nm/sec which is approximately 3.3 times greater than that of the comparative example.

After that, optical waveguide elements as the examples of the present invention were produced by using a binary target containing $SiO_2$ and $ZrO_2$ according to the steps explained with reference to FIGS. 2 to 4. In the optical waveguide, a relative refractive-index difference relative to the cladding portion was 5% and a cross-sectional size was 3.0 μm×3.0 μm. In order to evaluate propagation losses, the optical waveguides were vortex-shaped circuits having different lengths and a bending radius of 500 μm. When producing the optical waveguide elements, an annealed temperature was set at 1300° C. for precipitating and forming a $ZrO_2$ crystalline particle.

Figure 11:
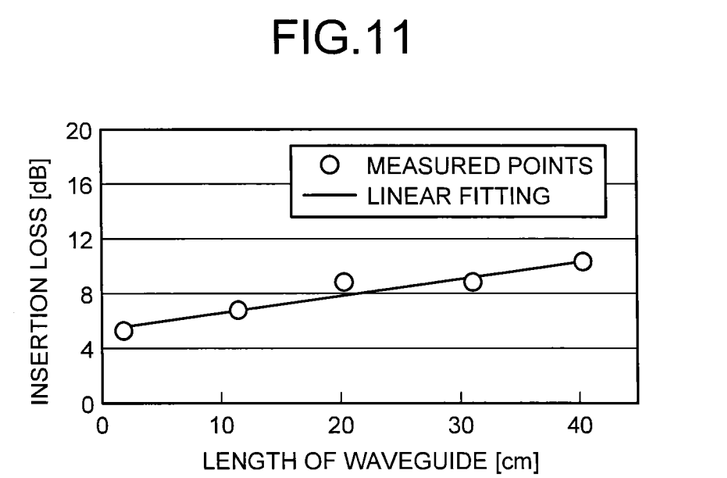
FIG. 11 is a view showing results of evaluating propagation loss of optical waveguide elements of the examples.

FIG. 11 is a view illustrating results of evaluating propagation loss of optical waveguide elements of the examples. A horizontal axis indicates a length of the optical waveguide and a vertical axis indicates an insertion loss. A propagation loss, of the optical waveguide, calculated by a linear fitting from the results of measured points shown in FIG. 11 was 0.13 dB/cm.

Figure 12:
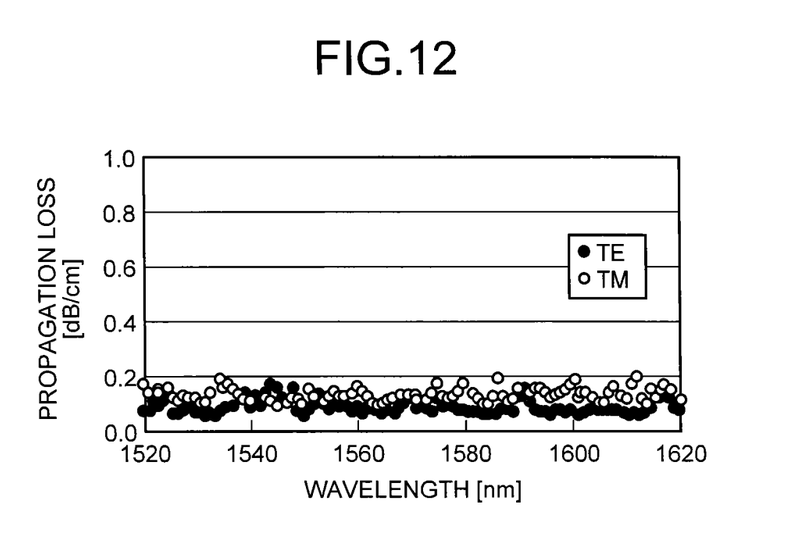
FIG. 12 is a view illustrating a propagation loss spectrum of the optical waveguide element of the example.

FIG. 12 is a view illustrating a propagation loss spectrum of the optical waveguide element of the example within a range of wavelengths 1520 nm to 1620 nm. As illustrated in FIG. 12, a propagation loss of the produced optical waveguide element was equal to or lower than 0.2 dB/cm over a 1550 nm wavelength band (wavelengths of 1520 nm to 1620 nm) in either one of a TM polarization and a TE polarization.

Figure 13:
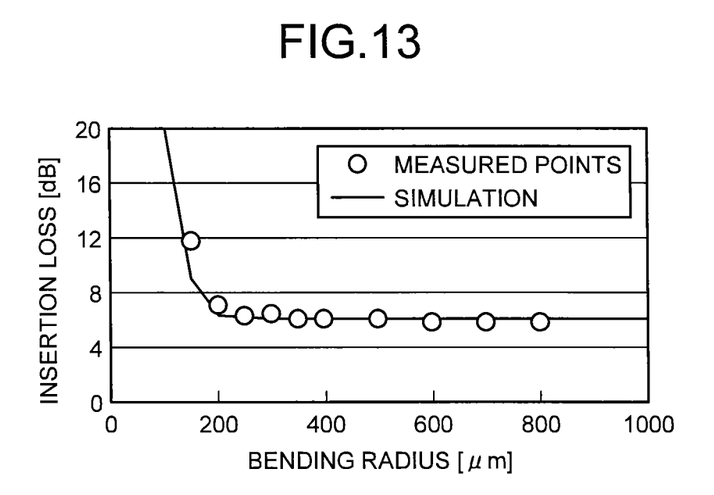
FIG. 13 is a view showing a relationship between bending radii and insertion losses of the optical waveguide elements of examples.

Meanwhile, an increase in a relative refractive-index difference of the optical waveguide relative to the cladding portion increases a confinement of a light and decreases a minimum bending radius. Therefore, the increase in the relative refractive-index difference is effective for reducing the optical waveguide element in size. For examples of the present invention, optical waveguide elements were produced in various bending radii to measure their insertion losses. In the optical waveguide, a relative refractive-index difference relative to the cladding portion was 5% and a cross-sectional size was 3.0 μm×3.0 μm. FIG. 13 is a view illustrating a relationship between bending radii and insertion losses of the optical waveguide elements of the examples. Data points indicate measured values, and a solid line indicates a simulation result. For an optical waveguide element having an optical waveguide made of a silica glass doped with $GeO_2$, a minimum bending radius is limited to approximately 1 mm. On the other hand, as illustrated in FIG. 13, the minimum bending radius of the produced optical waveguide element was reduced to a great extent, i.e., to approximately 300 μm, and coincided with the result of the simulation.

Figure 14:
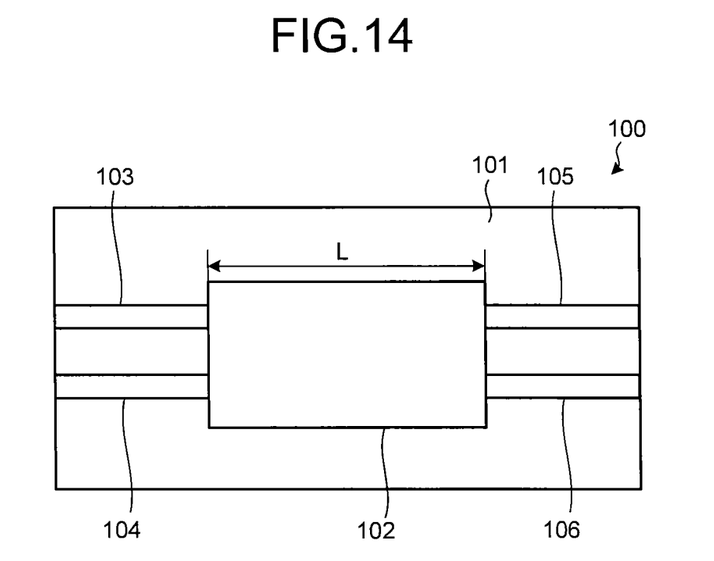
FIG. 14 is a schematic plan view of an MMI optical coupler of the example.

After that, a Multi-Mode Interference (MMI) optical coupler was produced as an example of the present invention. FIG. 14 is a schematic plan view of an MMI optical coupler of the example. The MMI optical coupler 100 includes a cladding portion 101 made of a silica glass, an MMI portion 102 and optical input/output portions 103, 104, 105, and 106 which are optical waveguides positioned in the cladding portion 101 and made of a silica glass in which a $ZrO_2$ particle is dispersed. A relative refractive-index difference of any of optical waveguides relative to the cladding portion was 5%. Cross-sectional sizes of the optical input/output portions 103, 104, 105, and 106 were 3.0 μm×3.0 μm. For cross-sectional sizes of the MMI portion 102, a thickness was 3.0 μm and a width was 24 μm. Both an interval between the optical input/output portions 103 and 104 and a distance between centers of the optical input/output portions 105 and 106 were 8.0 μm. A plurality of MMI optical couplers 100 were produced in which lengths of the MMI portions 102 (MMI length L) vary within a range of 310 μm to 510 μm.

Figure 15:
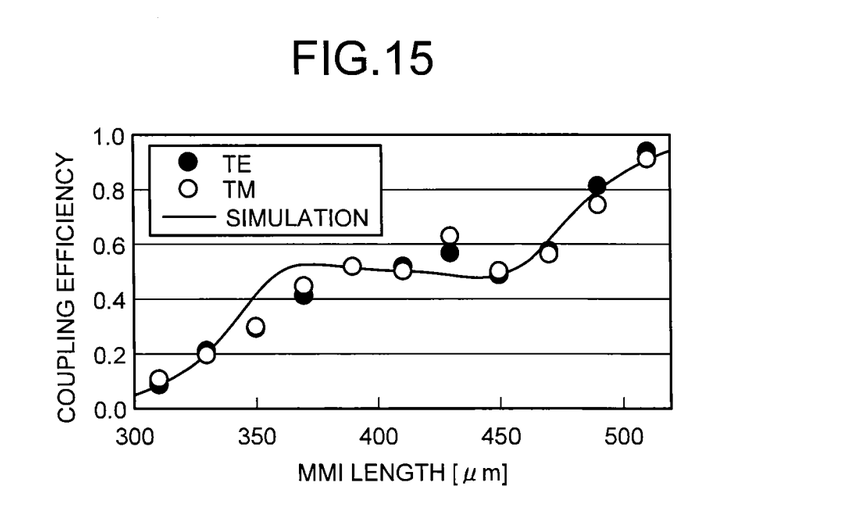
FIG. 15 is a view illustrating a relationship between an MMI length and a coupling efficiency of the MMI optical coupler of the example.
Figure 16:
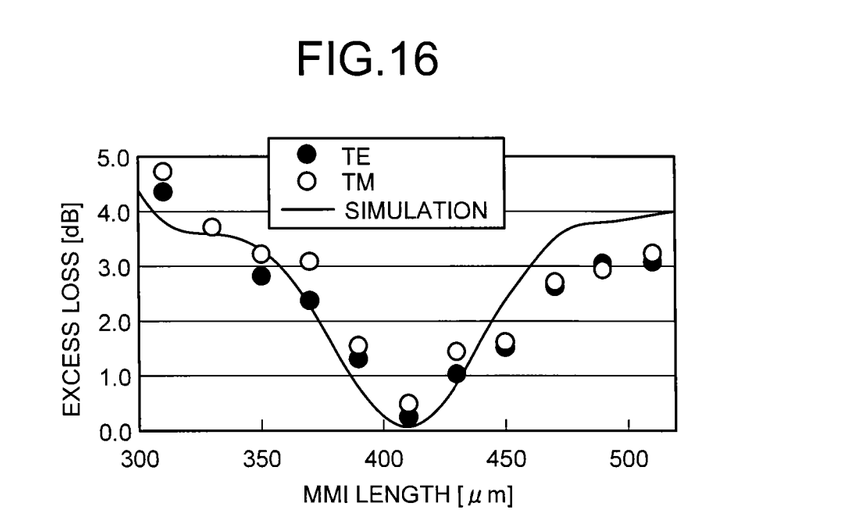
FIG. 16 is a view showing a relationship between an MMI length and an excess loss of the MMI optical coupler of the example.

FIG. 15 is a view illustrating a relationship between MMI lengths and coupling efficiencies of the MMI optical couplers of the examples. FIG. 16 is a view illustrating a relationship between MMI lengths and excess losses of the MMI optical couplers of the examples. Points of data in the drawing indicate results of measurement at TM polarization or TE polarization, and a solid line indicates a result of a simulation. As illustrated in FIGS. 14 and 15, the measured results coincided with the simulation result very well. The lowest value of an excess loss was 0.2 dB.

In the above-described embodiment, the lower cladding layer was formed by using plasma CVD method and the upper cladding portion was formed by using FHD method. However, methods of forming the lower cladding layer and the upper cladding portion are not limited specifically. The lower cladding layer and the upper cladding portion can be formed by, for example, an arbitrarily selected one of methods among thermal oxidation, plasma CVD, sputtering, and FHD.

As described above, an optical waveguide element and a method of producing the optical waveguide element according to the present invention are suitable for use in a field of optical communications.

The present invention is not limited to the above described embodiment. The present invention includes a configuration appropriately combining the above-described elements.

Further effects or modification examples can be derived by an ordinary skilled person in the art easily. Therefore, further wide aspects of the present invention are not limited to the specific, detailed, and representative embodiment explained and described above. Accordingly, various modifications may be made without departing from the spirit or scope of the general inventive concept as defined by the appended claims and their equivalents.

The invention claimed is:

1. An optical waveguide element comprising:
   a cladding portion made of a silica-based glass;
   a multi-mode interference portion; and
   a plurality of optical waveguides positioned in the cladding portion and made of a silica-based glass in which crystalline $ZrO_2$ particles are dispersed,
   wherein the optical waveguide element is a Planar Lightwave Circuit (PLC), and
   wherein the multi-mode interference portion is formed between a plurality of input and output optical waveguides.

2. The optical waveguide element according to claim 1, wherein
   a particle size of the particle is equal to or smaller than 100 nm, and
   an average distance between the crystalline $ZrO_2$ particles is equal to or larger than 100 nm and is equal to or smaller than a wavelength of a light input to the optical waveguides.

3. The optical waveguide element according to claim 2, wherein the average distance between the crystalline $ZrO_2$ particles is equal to or smaller than 1.62 μm.

4. A method of producing an optical waveguide element, the method comprising:
   forming a cladding portion made of a silica-based glass; and
   forming an optical waveguide positioned in the cladding portion and made of a silica-based glass in which crystalline $ZrO_2$ particles are dispersed,
   wherein the forming of the cladding portion includes forming a lower cladding layer on a substrate, and
   wherein the forming of the optical waveguide includes:
   forming an optical-waveguide-forming layer on the lower cladding layer, $ZrO_2$ being dispersed in the optical-waveguide-forming layer;
   forming crystalline $ZrO_2$ particles by heat-treating the optical-waveguide-forming layer; and
   forming the optical waveguide by etching the optical-waveguide-forming layer in which the crystalline $ZrO_2$ particles are dispersed,
   wherein the forming of the crystalline $ZrO_2$ particles include a heat treatment conducted at a temperature equal to or higher than 1000° C. and equal to or lower than 1300° C., and
   wherein the forming of the optical-waveguide-forming layer is conducted by a sputtering method using a unary target containing an $SiO_2$ or a $ZrO_2$, or using a binary target containing an $SiO_2$ and a $ZrO_2$.

5. The method of producing the optical waveguide element according to claim 4, wherein
   a particle size of the particle is equal to or smaller than 100 nm, and
   an average distance between the crystalline $ZrO_2$ particles is equal to or larger than 100 nm and is equal to or smaller than a wavelength of a light input to the optical waveguide.

6. The method of producing the optical waveguide element according to claim 5, wherein the average distance between the crystalline $ZrO_2$ particles is equal to or smaller than 1.62 μm.

7. The method of producing the optical waveguide element according to claim 4, wherein the forming of the cladding portion includes forming an upper cladding portion so that the upper cladding portion covers the formed lower cladding layer and the optical waveguide.

8. The method of producing the optical waveguide element according to claim 4, wherein the forming of the crystalline $ZrO_2$ particles is conducted under an atmosphere including an oxygen.

* * * * *